United States Patent [19]

Strong

[11] Patent Number: 4,535,977
[45] Date of Patent: Aug. 20, 1985

[54] APPARATUS AND METHOD FOR A SUSPENSION SYSTEM

[75] Inventor: John R. Strong, King County, Wash.

[73] Assignee: Paccar Inc., Bellevue, Wash.

[21] Appl. No.: 572,965

[22] Filed: Jan. 23, 1984

Related U.S. Application Data

[63] Continuation of Ser. No. 285,584, Jul. 21, 1981, abandoned.

[51] Int. Cl.³ ............................................. F16F 9/06
[52] U.S. Cl. .................... 267/64.15; 188/269; 188/276; 261/82; 261/94; 261/DIG. 72
[58] Field of Search .............. 188/266, 268, 269, 276, 188/322.5; 267/64.11, 64.13, 64.15, 64.16, 64.19, 64.27, 113, 124, 128; 252/307; 521/50, 56, 65, 73; 261/DIG. 26, 81, 82, 92, 94, DIG. 72; 55/55, 68, 159

[56] References Cited

U.S. PATENT DOCUMENTS

| | | | |
|---|---|---|---|
| 1,886,712 | 11/1932 | Messier | 267/64.15 |
| 2,154,231 | 4/1939 | Daimler et al. | 252/307 X |
| 2,774,447 | 12/1956 | DeCarbon | 188/269 |
| 2,805,854 | 9/1957 | Gaebler | 267/64.19 |
| 2,999,680 | 9/1961 | Eiseman, Jr. | 267/64.27 X |
| 3,056,473 | 10/1962 | Zeidler | 188/276 |
| 3,194,355 | 7/1965 | Jeromson, Jr. | 188/268 |
| 3,424,448 | 1/1969 | Chak Ma | 188/268 X |
| 3,479,285 | 11/1969 | Barthauer | 252/307 X |
| 3,494,607 | 2/1970 | Rusch | 188/268 X |
| 3,598,742 | 8/1971 | Jamison et al. | 252/307 X |
| 3,796,657 | 3/1974 | Pretorius et al. | 261/94 X |
| 3,879,023 | 4/1975 | Pearce et al. | 267/64.11 |
| 4,333,893 | 6/1982 | Clyde | 261/DIG. 72 |

FOREIGN PATENT DOCUMENTS

| | | | |
|---|---|---|---|
| 1549300 | 12/1968 | France | 188/269 |

Primary Examiner—Bruce H. Stoner, Jr.
Assistant Examiner—Michael P. Gilday
Attorney, Agent, or Firm—Seed and Berry

[57] ABSTRACT

An apparatus for a suspension system in a vehicle provides both spring and damping characteristics in a single unit. Within a closed container that has a variable volume (similar to commonly available shock absorbers), a gas-liquid interfacial system acts under input deflection from the axle of a vehicle to provide both spring and damping characteristics. To increase the damping response time of the system, the interfacial area in contact between the gas and the liquid is increased over the ordinary cross-sectional area of the container. The gas is soluble in the liquid and preferably increases in solubility with an increase in temperature so that, as the temperature increases and the gas expands, the static condition of the container is substantially maintained by the increase in absorption of the gas into the liquid. Preferably, pentane thickened with 3% aluminum octoate and 4% oleic acid is the liquid. It is stored in an open-cell urethane foam having an average pore cell size of approximately 0.05 inch (0.127 cm). This liquid is saturated with hydrogen gas at a pressure of about 500 psi when the apparatus is in its static position.

14 Claims, 2 Drawing Figures

APPARATUS AND METHOD FOR A SUSPENSION SYSTEM

This application is a continuation of U.S. patent application Ser. No. 285,584, filed July 21, 1981, now abandoned under 37 C.F.R. § 1.62.

DESCRIPTION

1. Technical Field

This invention relates to an apparatus for a suspension system in a vehicle which provides both spring and damping characteristics in a single unit.

2. Background Art

Characteristically, the suspension system of a vehicle includes separate units to provide spring action for the axle and damping force or shock absorbing for the vehicle. These separate units occupy valuable space on the frame and add weight to the vehicle. A device which could incorporate both the spring and damping characteristics into a single unit would be an improvement.

In U.S. Pat. No. 3,879,023 (incorporated by reference in this specification), a method for absorbing and releasing energy uses a gas-liquid system in which the gas phase dissolves in the liquid as a positive pressure is applied to the system. The liquid phase comprises a substance which is a liquid at atmospheric pressure and at a temperature range of about $-50°$ F. to $+150°$ F. The gas phase is a substance which will remain a gas at atmospheric pressure and at the recited temperature range. The gas phase must be chemically inert with the liquid phase and essentially insoluble in the liquid phase at atmospheric pressure. The gas phase is stored in a chamber above the absorption liquid. A piston presses against the liquid to increase the pressure in the gas chamber and to force the gas to diffuse and dissolve in the absorption liquid. As the gas dissolves in the liquid, energy is absorbed, and the energy is restored to the system when the pressure is released.

In U.S. Pat. No. 2,999,680, a working fluid is maintained under pressure in the suspension chamber of a pneumatic spring. The working fluid consists essentially of a mixture of a condensing gas and a noncondensing gas. The condensing gas consists of at least one substantially nontoxic inert compound which is capable of existing in both the liquid phase and the gaseous phase under the operating conditions of temperature and pressure to which the suspension chamber and the pneumatic spring are subjected. The condensing gas preferably comprises between about ten to ninety percent of the total pressure of the suspension chamber based on comparative vapor pressures of the liquids. A sufficient amount of the condensing gas is present so that it maintains a liquid pool occupying a fraction of the volume of the suspension chamber. When the spring is deflected, at least part of the condensing gas condenses, thereby achieving softness for the spring. When the spring returns to its original position, the condensed liquid evaporates back to its gaseous state. As indicated in Example 3 of the patent, to maintain the total pressure constant over a variety of temperatures, it is necessary to employ suitable means, such as a valve and compressor system, to remove gas from the pneumatic spring as the temperature rises and to add gas to the spring as the temperature falls.

U.S. Pat. No. 2,805,854 discloses a spring system which can accommodate variable loads by changing the amount of gas filling a gas chamber in the spring. When the vehicle is loaded, the pressure of a gas in the spring is increased by means of a temperature change (an increase) applied to the liquid. The gas spring system becomes correspondingly more dense as a load is applied, and the heating device is thereby automatically operated to heat the gas cushion until it has the desired volume under the applied load so that the loaded spring will have the desired supporting capacity.

Although these United States patents disclose gas-liquid systems for use as springs in suspension systems, improvements are necessary to develop a commercially feasible system. Because the interfacial area between the gas and liquid is small when the only contact between the gas and liquid is at the surface of a pool of liquid stored in the spring cylinder, the systems of these patents are too slow acting to be useful as dampers for truck suspensions. That is, without a means to increase the interfacial contact area between the liquid and gas, the suspension systems proposed in the prior art fail to allow the needed response to large deflections generated as a tire and axle pass over relatively bumpy roads. Damping in these systems is diffusion dependent, and the diffusion rate is too slow to achieve meaningful damping.

DISCLOSURE OF INVENTION

A single suspension element, similar in cost and appearance to a common shock absorber, combines the function of a spring and damper while reducing the cost and weight of the suspension system. The invention includes a means for forming a closed container that has a variable volume into which a liquid is placed to fill partially the volume, and a gas is injected to form a gas-liquid interfacial system. The gas should be soluble in the liquid, and sufficient gas should be supplied to the system so that in its static condition, the liquid is saturated. To increase the interfacial area of contact between the gas and liquid (to achieve damping), means are used so that the gas-liquid interface is larger than the interfacial area ordinarily available merely in the cross-sectional area of the container. One suitable means for increasing the interfacial area is an open-cell foam on which the liquid is capable of forming a film. Thereby, the liquid will tend to form a large surface area covering the foam in which the gas may dissolve. This system is less diffusion dependent than commonly available systems because of the increased surface area for contact, and, therefore, is more responsive to the deflections ordinarily encountered by axles of vehicles.

The apparatus for the suspension system operates as a common gas spring for the initial deflection period (i.e., the short time frame). Because the gas is soluble in the liquid, the increase in pressure caused by a deflection (which reduces the volume of the suspension system) causes gas to be absorbed into the liquid. This absorption of gas serves to dampen the energy input caused by deflection and acts as a means for absorbing or releasing energy. For example, if the volume is suddenly decreased, the gas will be compressed and the pressure will rise considerably. With the passage of time under the increased pressure, the gas will dissolve into the liquid. An equilibrium will ultimately be attained somewhere between the original static condition of the spring and the initially high, deflected condition. The absorption dissipates mechanical energy, increasing the temperature of the mixture within the suspension unit. The time dependence of the damping is a function of the area of contact between the gas and liquid (i.e., the rate of absorption of the gas into the liquid). Therefore, to ensure that there be adequate surface area, it is important that the liquid be wettable upon the surface of the open-celled foam. A foam is one convenient means for greatly increasing the area in contact for the liquid-gas interfacial system.

Another novel feature of this invention is that the solubility of the gas preferably increases as the temperature increases so that the volume change of the gas due to heating is substantially countered by the increased solubility of the gas in the liquid. Thus, as an increasing amount of gas is absorbed into the liquid and the gas expands with the increased temperature, the static height of the cylinders of the suspension unit will be maintained substantially equal over the commonly encountered operating range of temperatures, and the apparatus becomes nearly temperature independent. That is, once a combined characteristic of spring and damping is chosen for the apparatus, the apparatus will operate substantially identically over the commonly encountered operating range of temperatures.

Preferably, the liquid is a lighter aliphatic hydrocarbon having no more than about twelve carbon atoms in its carbon chain. Of course, mixtures of suitable lighter aliphatic hydrocarbons may be used. A preferred gas is hydrogen injected into the apparatus to form a static pressure for the system between about 100-1000 psi. This prepressurization ensures that there is sufficient excess of hydrogen in the system to ensure that the apparatus will function both as a spring and a damper.

To further ensure that there be an adequate contact area for the gas/liquid interfacial system, a viscosifier may be added to the liquid to thicken the liquid and to increase its resistance to flow. Using a thickener helps to guarantee that the increased pressure caused by deflection of the apparatus will fail to drive the liquid from the pores of the foam.

BEST MODE FOR CARRYING OUT THE INVENTION

1. Introduction

Customarily, suspension systems for trucks use an independent spring and an independent shock absorber to provide resiliency and damping force for input deflection of an axle. If the spring and shock absorber could be combined into a single element, there would a significant savings in equipment and assembly cost. An apparatus for a suspension system employing a gas-liquid interfacial system wherein the gas is soluble in the liquid provides the needed capacity for spring and damping characteristics, improving the suspension systems of vehicles.

2. The Suspension Apparatus

Figure 1:
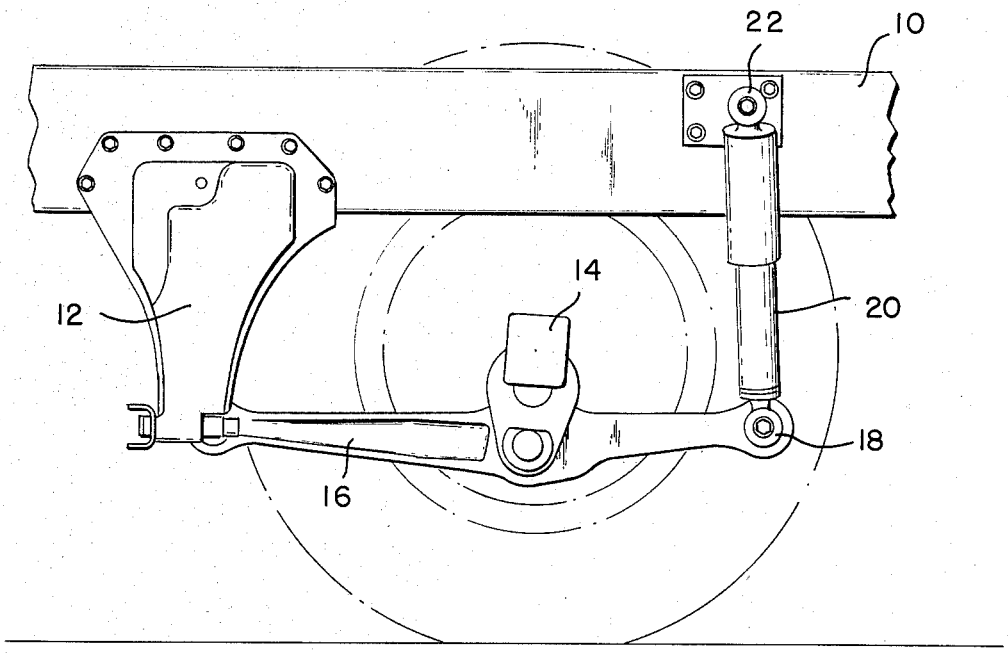
FIG. 1 is a side elevation showing the apparatus for a suspension system of this invention.

As shown in FIG. 1, a truck frame 10 has a frame bracket 12 mounted to extend downwardly from the frame 10. An axle 14 is supported by a suspension arm 16 which extends substantially horizontally from the frame bracket 12. At the rearward end of the suspension arm 16, a bushing 18 connects the spring-damper apparatus 20 of this invention to the suspension arm 16. Similarly, a bracket and stud 22 on the frame 10 is used to connect the spring-damper apparatus 20 to the frame 10.

Figure 2:
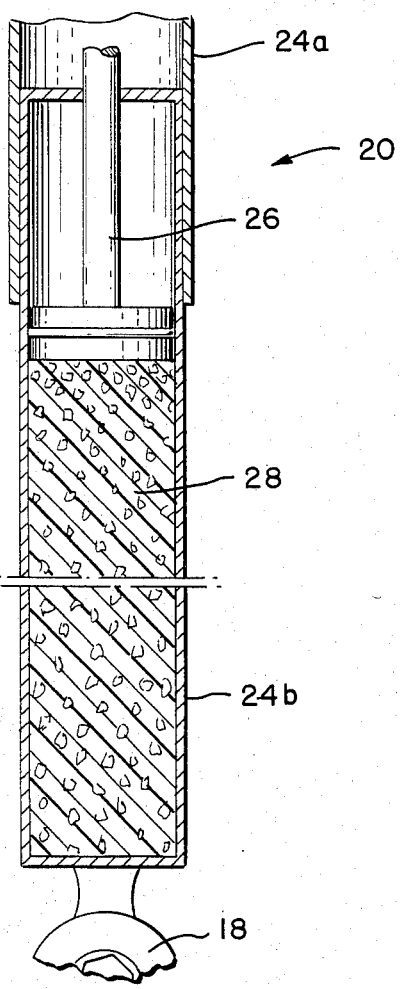
FIG. 2 is a partially schematic cross-section of an apparatus of this invention.

As shown in FIG. 2, the spring-damper apparatus 20 of this invention preferably comprises a pair of telescoping cylinders 24a and 24b which define a closed container that has a variable volume. A piston 26 is attached to the outer cylinder 24a of the pair to slide sealingly along the inner surface of the smaller cylinder 24b to define a smaller variable volume in the smaller cylinder 24b. In the variable volume below the piston 26, the gas-liquid system of this invention is used to provide combined spring and damping characteristics for the apparatus. Because the liquid phase of the gas-liquid system preferably wets the surface of an open-cell foam 28, FIG. 2 appears to show merely a single-phase element existing below the piston 26. However, a fairly complex chemical system is employed in this variable volume to achieve the combined characteristics of a spring and a damper.

To seal volatile fluids into the unit, at least two means may be used. First, a rolling diaphragm may be clamped across the cylinder below the piston. The diaphragm should be elastic, impervious to the chemicals used and impermeable to the volatile fluids. Second, a floating piston may be used as a seal. Here, the piston has seal rings which abut the piston and the inside wall of the cylinder. Below the piston is a pool of substantially incompressible fluid, such as hydraulic fluid, to form an effective seal by wetting against the cylinder walls. Finally, below the fluid is a second piston, which floats above the gas-dissolving media. This second piston also has suitable seal rings abutting the cylinder.

3. The Chemical System

Preferably, an open-cell foam 28 is placed in the volume below the piston 26 to create a means for significantly increasing the area in contact for the gas-liquid interfacial system which will be used to provide both spring and damper characteristics. The foam should be resistant to the chemicals in the system and should have a minimum of reticulation. The preferred cell size for the foam is an average cell size of about 0.05 inch (0.127 cm). Suitable foams are selected from the group of foams consisting of urethanes, polyethylenes, polypropylenes, and other foams. Urethane foam, however, is highly preferred.

Ideally, the chemical system would incorporate a closed-cell urethane foam which contained within each closed cell a small chemical system in which the gas phase could be absorbed in the liquid. Preparing a closed-cell foam which would incorporate this system, however, has proven to be problematic, and, alternatively, the open-cell foam approach just described works adequately to provide an apparatus which combines both the functions of a spring and a damper.

The gas-liquid interfacial system is critical to achieve damping. The liquid should be wettable on the foam so that a relatively large surface area is wetted when liquid is added to the foam. If the liquid is wettable on the foam, the liquid will form a film to cover the entire area of the foam rather than to form a pool of liquid at the bottom of the cylinder. By spreading out in a thin film, the liquid will present a large surface area of contact with the gas, thereby reducing the dependence of the system on diffusion of the absorbed gas into the reservoir of liquid. The system will become absorption dependent rather than diffusion dependent, and will be more responsive to deflections. To ensure that the liquid remain as a film on the surface of the foam, it is desirable to include in the liquid a viscosifier to thicken the liquid and to increase its resistance to flow. Thus, when the apparatus is subjected to an extreme deflection through the axle 14, the pressure change will not force the liquid from the pores of the foam 28. Furthermore, a wetting agent can enhance the wettability of the liquid on the foam by reducing the interfacial forces between the foam and the liquid, thereby increasing the resistance to flow from the surface. In some circumstances a single chemical may perform both functions of thickening and wetting.

The gas is soluble in liquid and is provided in excess to form a gas-liquid interfacial system. To ensure that the apparatus operates with substantially the same characteristics over the commonly experienced operating range of temperatures, it is highly preferred that the solubility of the gas in the liquid increase as the temperature of the system increases. Furthermore, if possible, the solubility of the gas in the liquid should substantially counter the volume change of the gas due to the increased temperature. If the solubility of the gas substantially counters the volume change, the static height of the means for forming a closed container (which is attached to the vehicle frame) will remain substantially the same over the operating range of temperatures. If the gas does not have the solubility characteristics desired of the preferred system, it may be essential to include pressure release means as described in U.S. Pat. No. 2,999,680.

A preferred liquid-gas interfacial system comprises hydrogen as the gas and pentane as the liquid. Preferably, the variable volume is charged with between about 100–1000 psi of hydrogen to saturate the pentane in the static condition for the apparatus. More preferably, the apparatus is initially charged with about 500 psi of hydrogen. Sufficient pentane is placed in the cylinder to partially fill the unoccupied volume of the cylinder below the piston and to ensure that the apparatus functions both as a spring and damper over the commonly experienced deflections experienced by a vehicle. Preferably, the pentane is thickened to form a mixture of about three percent aluminum octoate and about four percent oleic acid. This system provides the desirable characteristics of being a spring and being a damper. With this pentane-hydrogen, gas-liquid interfacial system, an open-cell urethane foam is highly preferred. Of course, other light aliphatic hydrocarbons or mixtures may be used. Preferably, the hydrocarbon liquid will have no more than about twelve carbon atoms in its saturated carbon chain. Other liquids may be used if they provide the functional characteristis described in this specification.

Throughout this specification, the term "operating range of temperatures" has been used to refer to the commonly experienced temperatures of a vehicle. This operating range of temperatures is ordinarily about −20° C. to about 100° C. when increases in the temperature of the apparatus are taken into account for mechanical heat generation and radiant heat absorption. More commonly, the operating range of temperatures will be between about 0° C. to 50° C.

I claim:

1. An apparatus for a suspension system in a vehicle which provides both spring and damping characteristics in a single unit, the apparatus acting like a pneumatic spring for a pressure change of short duration and acting like a damper for repeated pressure oscillations over a moderate time frame, the apparatus comprising:
    (a) a closed container that has a variable volume;
    (b) a liquid partially filling the volume;
    (c) a gas in the volume which is soluble in the liquid, but which is supplied in excess to form a gas-liquid interfacial system, wherein the liquid is saturated with the gas under static conditions, the solubility of the gas in the liquid increasing with an increase in temperature in a manner that substantially counters the volume change of the gas due to the increased temperature, thereby substantially maintaining constant the static height of the closed container over an operating range of temperatures;
    (d) a foam on which the liquid is capable of forming a film substantially filling the volume and holding the liquid in a film over at least a portion of the foam so that the surface area of the liquid in contact with the gas is greater than the cross-sectional area of the container; and
    (e) means for connecting the container into the suspension in the vehicle to provide spring and damping characteristics for the vehicle by the gas compressing or by the gas entering or leaving solution with the liquid.

2. The apparatus of claim 1 wherein the gas is hydrogen and the liquid is pentane.

3. The apparatus of claim 1 wherein the gas-liquid interfacial system has a static pressure of between about 100–1000 psi.

4. The apparatus of claim 3 wherein the static pressure is about 500 psi.

5. The apparatus of claim 1, further comprising a viscosifier in the liquid to thicken the liquid.

6. The apparatus of claim 5 wherein the viscosifier is a mixture of oleic acid and aluminum octoate.

7. The apparatus of claim 1, further comprising a wetting agent to improve the wettability of the liquid on the foam, thereby increasing its film-forming ability.

8. The apparatus of claim 1 wherein the liquid is a lighter aliphatic hydrocarbon.

9. The apparatus of claim 8 wherein the hydrocarbon has no more than about twelve carbon atoms.

10. The apparatus of claim 8 wherein the liquid is selected from the group of liquids consisting of lighter aliphatic hydrocarbons having no more than about twelve carbon atoms and mixtures thereof.

11. An apparatus for a suspension system in a vehicle which provides both spring and damping characteristics in a single unit, the apparatus acting like a pneumatic spring for a pressure change of short duration and acting like a damper for repeated pressure oscillations over a moderate time frame, the apparatus comprising:
    (a) a closed container;
    (b) a piston sealingly slidable within the container to define a variable volume;
    (c) a porous, open-cell foam substantially filling the volume to increase the area of contact between a gas and a liquid in an interfacial contact system;
    (d) liquid pentane in the volume forming a film over portions of the foam, the liquid thereby having a surface area greater than the cross-sectional area of the container;
    (e) a viscosifier in the pentane to thicken the pentane, thereby better maintaining the gas-liquid interfacial system with an enhanced surface area by making flow of the liquid more difficult;

(f) a gas in the volume in contact with the liquid film, at a static pressure of between about 100–1000 psi, and soluble in the pentane such that the solubility of the gas increases as the temperature increases to maintain substantially constant the static height of the container over an operating range of temperatures encountered during use of the apparatus; and (g) means for connecting the container and piston into the suspension in the vehicle to provide spring and damping characteristics for the vehicle by the gas compressing or by the gas entering or leaving solution with the liquid, wherein the liquid is saturated with the gas under static conditions.

12. The apparatus of claim 11 wherein the gas is hydrogen.

13. The apparatus of claim 11 wherein the viscosifier is a mixture of oleic acid and aluminum octoate.

14. In a method of suspension for a vehicle in which a gas-liquid interfacial system absorbs energy by dissolving a gas into a liquid during positive pressure changes and releases energy by having the gas leave solution during negative pressure changes caused by compression or expansion of a container holding the gas and liquid, the improvement comprising using a gas in the system which has increasing solubility in the liquid with increasing temperature so that the suspension apparatus has a relatively constant length over an operating range of temperature.

* * * * *